United States Patent
Kolar et al.

(10) Patent No.: US 11,553,819 B2
(45) Date of Patent: Jan. 17, 2023

(54) AUTOLAYERING BLENDING SYSTEM

(71) Applicant: Vita-Mix Management Corporation, Olmsted Township, OH (US)

(72) Inventors: David Kolar, Stow, OH (US); Brian Harvanec, Olmsted Township, OH (US); Rebecca Hammond, Olmsted Township, OH (US); Fred Mehlman, Brunswick, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 315 days.

(21) Appl. No.: 16/729,593

(22) Filed: Dec. 30, 2019

(65) Prior Publication Data

US 2020/0205613 A1 Jul. 2, 2020

Related U.S. Application Data

(60) Provisional application No. 62/785,898, filed on Dec. 28, 2018.

(51) Int. Cl.
*A47J 43/00* (2006.01)
*A47J 43/046* (2006.01)
*A47J 43/08* (2006.01)
*A47J 43/07* (2006.01)
*A47J 43/044* (2006.01)

(52) U.S. Cl.
CPC ......... *A47J 43/046* (2013.01); *A47J 43/0722* (2013.01); *A47J 43/085* (2013.01); *A47J 43/0727* (2013.01); *A47J 2043/04463* (2013.01)

(58) Field of Classification Search
CPC ............ A47J 43/046; A47J 2043/04463; A47J 43/0722; A47J 43/085; A47J 43/0727
See application file for complete search history.

(56) References Cited

U.S. PATENT DOCUMENTS

| | | | |
|---|---|---|---|
| 8,142,068 B2 | 3/2012 | McGill | |
| 2005/0018534 A1* | 1/2005 | Nikkah | A47J 43/0716 366/205 |
| 2007/0122516 A1* | 5/2007 | Qian | A23P 20/25 425/200 |
| 2014/0286120 A1* | 9/2014 | Kolar | B01F 13/047 366/142 |

* cited by examiner

*Primary Examiner* — Anshu Bhatia
(74) *Attorney, Agent, or Firm* — McDonald Hopkins LLC

(57) ABSTRACT

A blender system includes a blender base housing a motor. A container assembly may be selectively and operatively attached to the blender base. The container assembly may include two or more compartments. The motor drives an input spindle of a blade assembly. The blade assembly may blend foodstuff within the two or more compartments.

20 Claims, 11 Drawing Sheets

AUTOLAYERING BLENDING SYSTEM

CROSS-REFERENCE TO RELATED APPLICATION

This application claims priority to U.S. Provisional Patent Application No. 62/785,898 entitled "AUTOLAYERING BLENDING SYSTEM," filed on Dec. 28, 2018, which is incorporated herein by reference in its entirety.

TECHNICAL FIELD

The present invention relates to a blending system and, more particularly, to a blending system that layers a blended product when poured from a container.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains, and may be made with commercial or restaurant-grade blenders. Such drinks also may be made at home, using a personal blender.

Conventional blenders generally include a base with a motor, a blending container with an operable blade assembly disposed therein. A lid is adapted to cover the blending container. A user inserts contents within the blending container to be mixed by the rotation of the blade assembly. The blending container is positioned on the base as a user controls the operation of the motor within the base to rotate the blade assembly within the blending container to mix the contents therein.

Some users, such as commercial kitchens, may have a need to create layered, blended drinks. These layered drinks can be aesthetically pleasing. In some instances, the layered drinks may provide for a unique experience and different flavors. Traditionally, users blend different foodstuff in separate containers during different blending operations. The user then has to pour the different containers into a cup one at a time. This process is time consuming, uses multiple containers, and requires extended use of a blender base. In commercial kitchens, this may lead to customer dissatisfaction, extended wait times, and delay.

There is a need, therefore, for a blender system that can create a layered drink with improved efficiency, reduce time, and with reduced steps. Other needs are described herein or may be apparent through this disclosure.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Described herein is a blender system comprising a blender base, a motor housed in the blender base, a drive shaft coupled with the motor, a container assembly operatively attached to the blender base, wherein the container assembly comprises at least two compartments, and at least one blade assembly operatively attached to the container. In an example, a first blade assembly of the at least one blade assembly is operatively attached to a first compartment of the at least two compartments. The blender system may include a second blade assembly of the at least one blade assembly operatively attached to a second compartment of the at least two compartments. The motor operatively drives the first blade assembly and the second blade assembly when the first compartment and the second compartment are attached to the blender base. The container further comprises an input shaft operatively coupled to a drive shaft of the motor, and a gear drive assembly operatively receiving rotational force from the input shaft to drive the first blade assembly and the second blade assembly. In an aspect, the at least two compartments are vertically stackable. In an example, the container assembly comprises at least one near field communications component identifying parameters associated with the at least two compartments. The blender base may include a near field communications component operatively communicating with the at least one near field communications component of the container assembly.

Also disclosed is a blender system comprising a blender base comprising a motor, a gear box operatively attached to the blender base and operatively driven by the motor, a container assembly comprising at least two compartments that operatively receive foodstuff, and at least two blade assemblies operatively attached to the at least two compartments, and wherein the gear box operatively drives the at least two blade assemblies. The blender system may include at least one lid operatively attached to the container. In another aspect, the at least one lid may comprise a rotary spout. In an example, the blender system may include a first lid of the at least one lid operatively attached to a first compartment of the at least two compartments comprises a first side wall, and a second lid of the at least one lid operatively attached to a second compartment of the at least two compartments. In at least one example, each compartment may comprise a pour spout. According to an example, a first compartment of the at least two compartments may comprise a first side wall, wherein a second compartment of the at least two compartments may comprise a second side wall, and wherein the first side wall comprises a different height than the second side wall. In another aspect, the gearbox may be at least one of comprised within the container or comprises a housing operatively separable from the container.

Described herein is a container assembly comprising a bottom wall, a side wall, and at least one dividing wall, a plurality of compartments defined by the side wall, bottom wall, and at least one dividing walls housed within the container, and a blade assembly operatively attached to the bottom wall and comprising at least one blade, wherein the at least one blade operatively passes through the plurality of compartments when the blade assembly is rotated. In an example, each dividing wall of the at least one dividing wall may comprise a slotted opening for the passage of the at least one blade. Each slotted opening may comprise an elastomeric seal. The container assembly may comprise at least one pour spout defined by the side wall. The at least one dividing wall may comprise a first wall having a first height and a second wall having a second height and operatively configured such that pouring of foodstuff from the at least one pour spout results in a layered food product.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Figure 1:
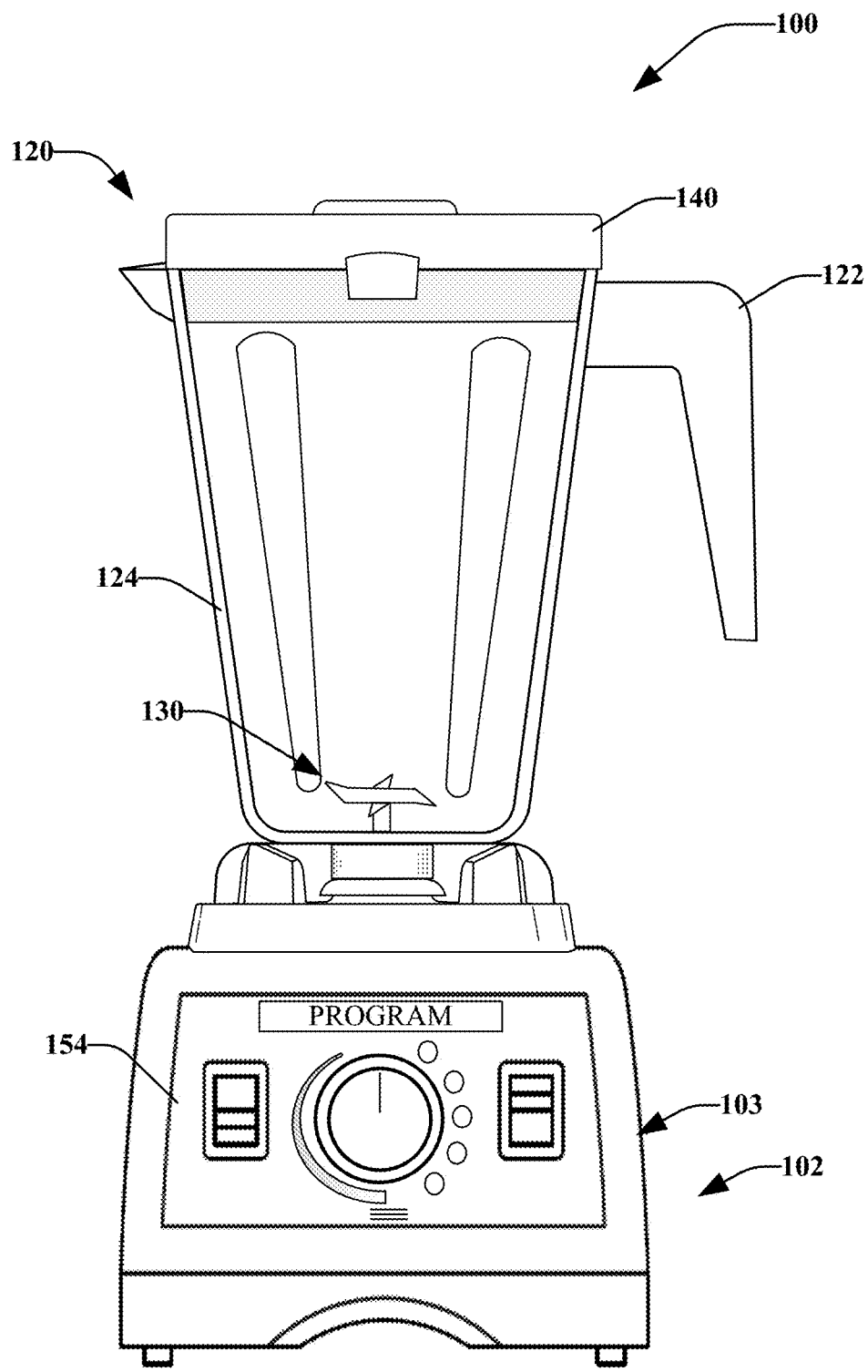
FIG. 1 illustrates an embodiment of a blender.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, home appliances, fans, power tools, or other machines using motors. As such, references to a blender, blending system, and the like, are understood to include the various other machines.

The terms "identification tag," "chip," "NFC component," and the like may be used interchangeably, unless context suggests otherwise or warrants a particular distinction among such terms. Such may refer to an NFC component or tag, which may be capable of sending/receiving a signal. It is noted that embodiments may utilize other radio frequency identification (RFID) devices, transponders, or tags. Accordingly, embodiments reference NFC for brevity, but such embodiments may utilize other RFID devices, methods, or systems.

Blender systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuff" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

FIG. 1 illustrates an exemplary blending system 100 in accordance with various disclosed embodiments. System 100 may utilize various disclosed aspects of the present teachings. For instance, system 100 may include a large format container, a personal serving sized container, or other blending container as described herein. It is noted that blending system 100 may include a universal motor with a controllable torque or speed, such as by a controller within a blender base 102. The controller may include memory that may store information and instructions, such as firmware that may be downloadable, updated, or the like.

System 100 primarily includes the blender base 102, a container 120 operatively attachable to the blender base 102, a blade assembly 130, and a lid 140 that may be operatively attached to the container 120. The container 120 may include walls 124 and a handle 122. Foodstuff may be added to the container 120 for blending. It is noted that the container 120 may comprise various materials such as plastics, glass, metals, or the like. In another aspect, container 120 may be powered in any appropriate manner.

The blade assembly 130, container 120, and base 102 may removably or irremovably attach. The container 120 may be powered in any appropriate manner. While shown as a large-format system, system 100 may comprise a single serving style system, where the container is filled, a blender base is attached to the container, and then the container is inverted and placed on a base. In another aspect, the container 120 may comprise different sizes and shapes, such as cylindrical or the like.

The base 102 includes a motor disposed within a housing 103. The motor selectively drives the blade assembly 130. The blade assembly 130 may agitate, impart heat, or otherwise interact with contents within the container. Operation of the blender system 100 may impart heat into the contents within container 120 according to a desired blending program.

In at least one embodiment, the blending system 100 may identify or detect whether the system 100 is interlocked through mechanical detection (e.g., push rods), user input, image recognition, magnetic detection (e.g., reed switches), electronic detection (e.g., inductive coils, a near field communication (NFC) component), or the like.

System 100 and processes described herein generally relate to blending or food-processing systems and may include a food-processing disc comprising one or more inductive coils. In another aspect, one or more of the disc(s), blender base 102, and/or lid may comprise an NFC component that may interact with an NFC component of a blender base. The NFC component of the blender base may receive information regarding the type of container and the blender base may utilize the information to determine a blending process to be utilized by the system. In another aspect, when the blender system is fully connected, the near field communication components may interact with each other. The interaction may allow operation of a motor and rotation of the blades within the container.

Figure 2A:
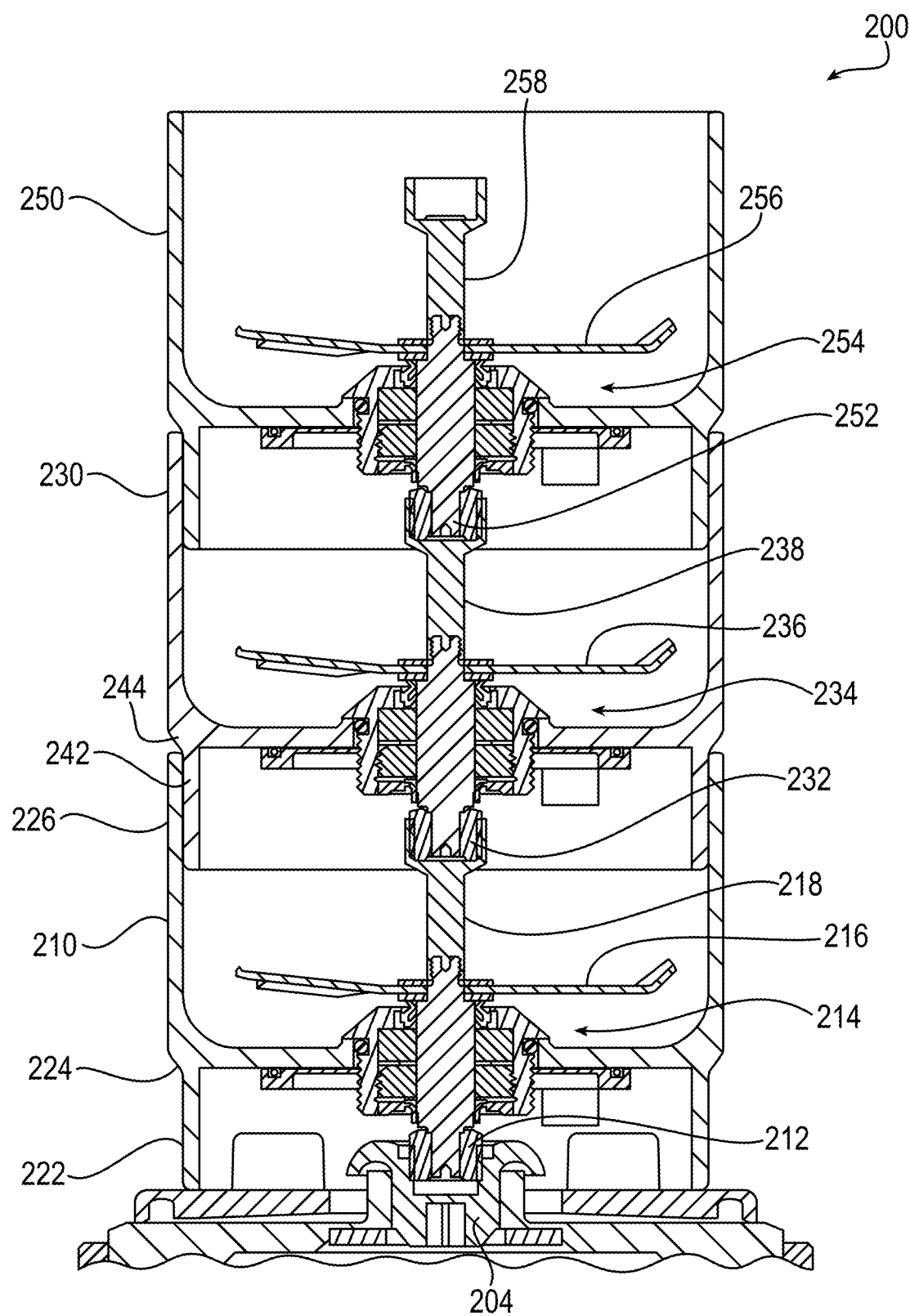
FIG. 2A illustrates a cross-sectional view of a stackable container assembly that may be utilized with a blender base.
Figure 2B:
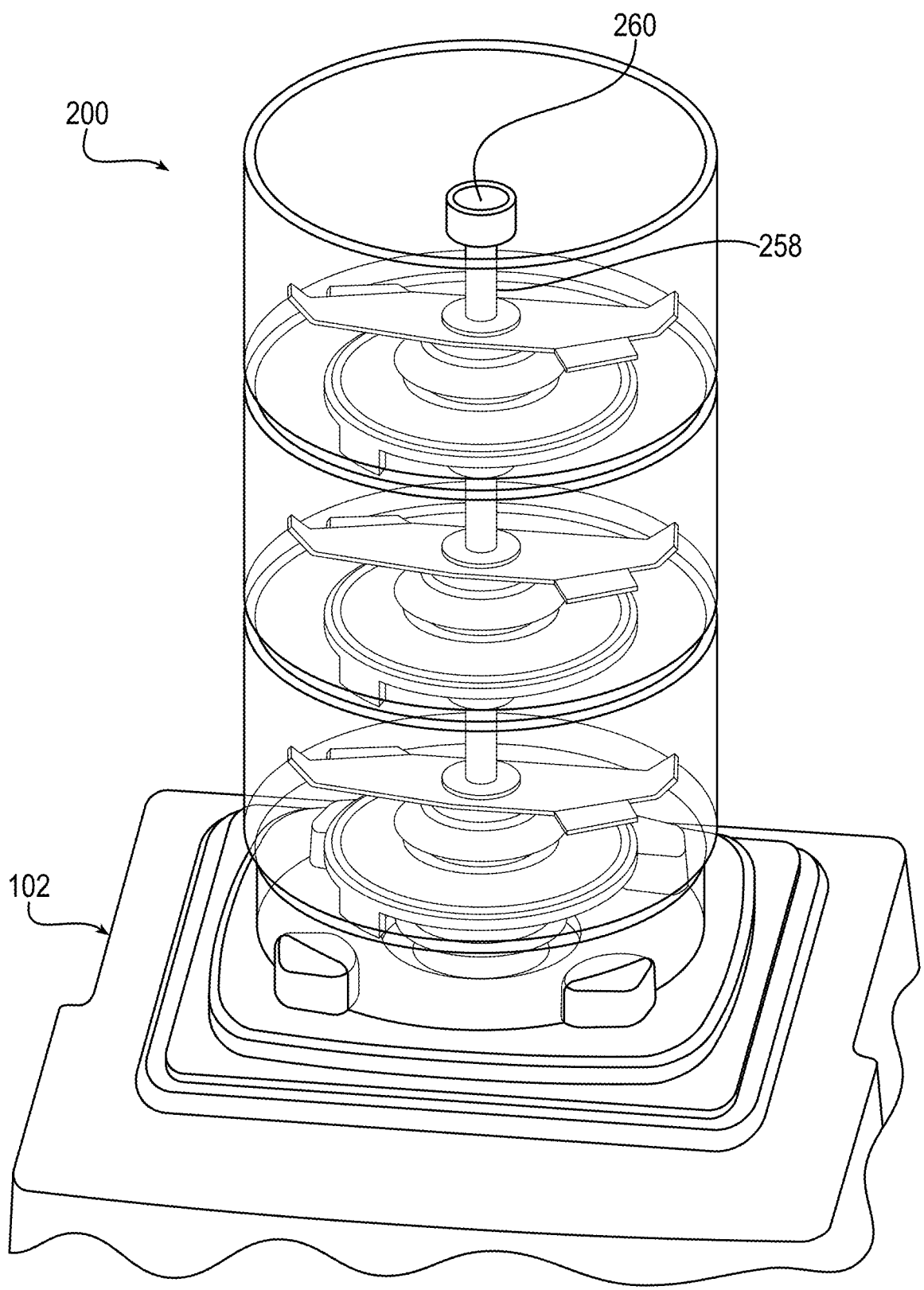
FIG. 2B illustrates a perspective view of the container assembly of FIG. 2A.
Figure 3:
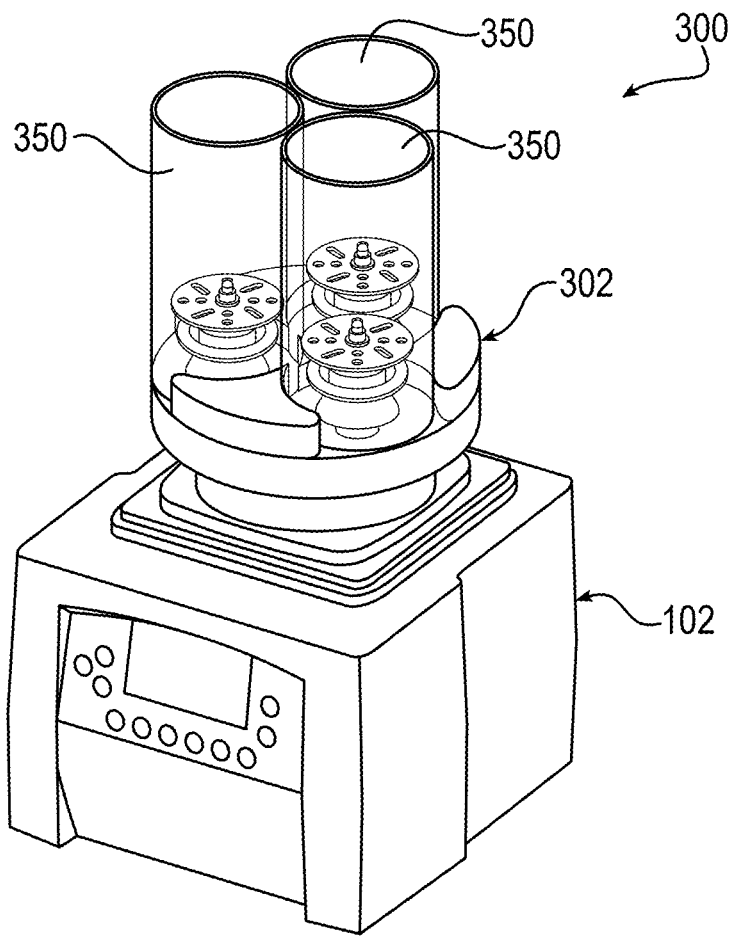
FIG. 3 illustrates a perspective view of a container assembly and gear box that may be utilized with a blender base.
Figure 4:
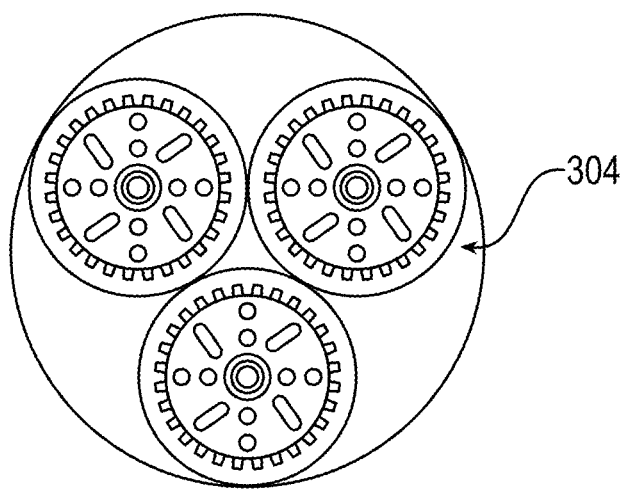
FIG. 4 illustrates a top view of the container assembly and gear box of FIG. 3.
Figure 5:
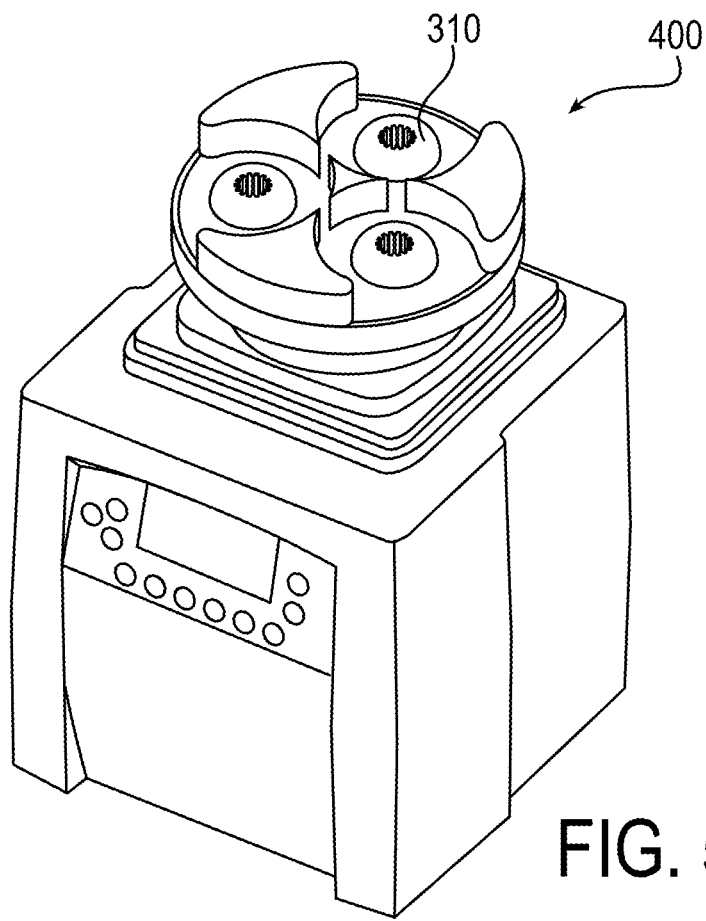
FIG. 5 illustrates a perspective view of the gear box of FIG. 3.
Figure 6:
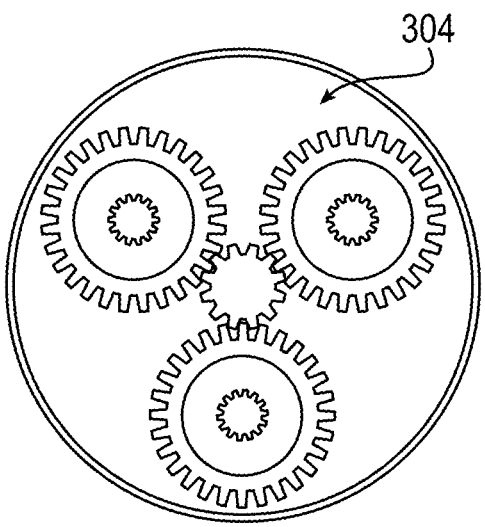
FIG. 6 illustrates a top, cross-sectional view of the gear box of FIG. 3.
Figure 7:
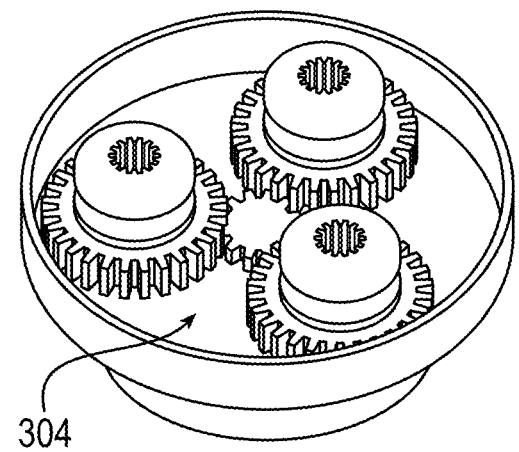
FIG. 7 illustrates a perspective, cross-sectional view of the gear box of FIG. 3.

Turning to FIGS. 2A-B, there is a container assembly 200 that may be operatively attached to the blender base 102. The container assembly 200 may comprise one or more compartments, 210, 230, and 250. It is noted that container assembly 200 may comprise different or other compartments, such as two or more (e.g., 2, 3, 4, 5, etc.) compartments.

The compartments 210, 230, and 250 may be selectively attached together. In an example, the compartments 210, 230, and 250 may be generally similar or identical to each other so that they may be stacked in a vertical configuration or any appropriate order or configuration. Accordingly, descriptions of a certain compartment(s) may generally apply to other compartment(s).

Compartment 210 may comprise an apron 222, a transition 224, and a container body 226. In an aspect, the apron 222 may operatively attach to or abut the blender base 102. The transition 224 may comprise a ledge, angled, chamfered, curved, beveled, or other surface disposed between the apron 222 and the container body 226. The container body 226 may operatively receive foodstuff to be blended. It is noted that the container body 226 may include indicia that may include gradient markings, fill lines, or the like.

In an example, the apron 222 may be sized and shape to nest within or otherwise attach to a container body of another compartment. As shown in FIG. 2A, the compartment 230 may include an apron 242 and a transition 244. The apron 242 may be sized to generally fit within the container body 226. In examples, the apron 242 may nest within the container body 226 to create a friction fit. In other embodiments, the apron 242 and the container body 226 may comprise threaded attachments, slot and tab, a bayonet-style attachment, magnetic attachments, or the like. In at least some embodiments, a gasket or seal (not shown) may be disposed between the apron 242 and the container body 226 to generally prevent foodstuff from spilling or leaking during a blending process. It is further noted that a container lid (not shown) may be operatively attached to the top compartment, such as compartment 250 in FIG. 2A. A blade may include a shaft that extends into a compartment within the lid that will allow mixing of foodstuffs within the compartment in the lid. Moreover, the compartments may be of different configurations, i.e., smoothie personal container with a larger standard container. A compartment may comprise multiple spouts that are configured differently to allow different consistency of fluid to exit.

According to embodiments, each compartment may comprise a blade assembly. For instance, the compartments 210, 230, and 250 may respectively include blade assemblies 214, 234, and 254, which each comprise blades 216, 236, and 256. Moreover, each blade assembly 214, 234, and 254 may comprise an input shaft 212, 232, and 252 that may comprise splined couplers. The blade assemblies 214, 234, and 254 may further comprise output shafts 218, 238, and 258. The output shafts 218, 238, and 258 may include corresponding splined couplers, such as coupler 260. The input shafts 212, 232, and 252 are generally sized and shaped to attach with output shafts 218, 238, and 258 so that power from a drive shaft 204 of the blender base 102 may drive each blade assembly 214, 234, and 254 at the same time.

In an example, a user may add foodstuff to each compartment 210, 230, and 250. The foodstuff may comprise different ingredients in each compartment 210, 230, and 250 for different layers in a blended product. The compartments 210, 230, and 250 may include indicia or NFC components to direct the user as to which compartment should receive each ingredient. The compartments 210, 230, and 250 may be the same or different sizes and may comprise the same or different gear drives. The user may then attach each compartment 210, 230, and 250 and may place them on the blender base 102. The user may then select a program or the blender base 102 may automatically select a program based upon indicia or another communication system between the compartments 210, 230, and 250 and the blender base 102 such as a near field communication component (NFC) or RFID. The program may be operated to blend foodstuff and the resulting blended products may be added to a container or serving vessel. This may create a blended product through execution of a single blending process. Further still, the program may be operated to blend foodstuffs in a way that one or two blending processes may be performed that results in more than a single-layer blended product, such as two, three, four, five, six, etc.

It is further noted that the blender base 102 may determine or detect a number of compartments attached to the blender base 102. The blender base 102 may determine whether the compartments are operatively interlocked, whether a lid is interlocked, whether an appropriate amount of compartments are in use, or the like. The blender base 102 may determine whether the components are interlocked based upon mechanical detection or communication via a near field communication (NFC) component or RFID. Moreover, in at least some embodiments, the blender base 102 may determine an appropriate blending process based on the number of detected containers. For instance, the blender base 102 may determine an appropriate motor speed, torque, or the like based on the number of containers or indicia located on the containers. In an example, each compartment 210, 230, and 250 may include an RFID or NFC tag. The blender base 102 may also include an RFID or NFC tag that communicates with one or more of the tags of the compartments to determine which compartments are attached, what order the compartments are attached, or the like. Based on determining the information associated with the compartments, the blender base 102 may perform or select an appropriate blending process.

It is further noted that the blender base 102 may include an interface to receive information from a user, a point-of-sale system, user devices (e.g., tablet, smartphone, etc.), or the like. The blender base 102 may select a blending partner based on the received information, determine whether an appropriate number or order of compartments or are attached, or the like. In some embodiments a cover may be operatively attached with the blender base 102 that encases the container or containers to help reduce noise during operation thereof.

Turning now to FIGS. 3-9, there is a blending system 300 that may blend different foodstuff in different compartments and may allow for layering of foodstuff during a single pouring operation. The blending system 300 may generally include the blender base 102, a gear box 302 and compartments 350 (which may collectively create a container assembly). It is noted that each compartment 350 may comprise the same or different configurations. For instance, some compartments 350 may be configured for personal smoothie use, may be disposable, or the like. Other compartments may comprise large format containers.

As described in more detail herein, the blender base 102 and gear box 302 are operatively attached so that the output or drive shaft of the blender base 102 drives an input shaft of the gear box 302, which in turn drives blade assemblies of the compartments 350. While three compartments 350 are shown, it is noted that any appropriate number of compartments 350 may be utilized, e.g., two, four, five, etc. Likewise, the gear box 302 may comprise an appropriate number of seats or couplings 310 for the compartments 350.

The gear box 302 may comprise a gear drive 304 that includes one or more gears that alter the rotational speed of blades relative to the rotational speed of the motor. The altered speed may allow for driving of multiple blade assemblies in the compartments 350. It is noted that the altered speeds may also include an increased number of speed options, altered airflow within the blender container, reduced noise, increased user satisfaction, and the like.

In an aspect, the driven-to-drive ratio of the gear drive 304 may be about an x:1 ratio, where x is a number. For instance, exemplary embodiments may comprise a 2.25:1, 2.5:1, 2.8:1, 3:1 or other gear reduction from input to output ratio as described herein. According to various other examples, x may be generally greater than 1 and less than about 5, at or between 2 and 3.5, or the like. In at least one embodiment, the maximum input speed may be about 22,500 RPM and the maximum input torque may be about 240 newton meters—although the present teachings are not limited to this configuration. As described herein, the gear drive 304 may include a planetary gear drive or train, such as an epicyclical gear train. A k-level epicyclical gear train, where k is a number, may include one or more outer gears, or planet gears, revolving about a central, or sun gear, and an outer ring gear or annulus, which meshes with the planet gears. As an example, embodiments may include a dual ratio gear set comprising a two-level epicyclical gear train.

Figure 8:
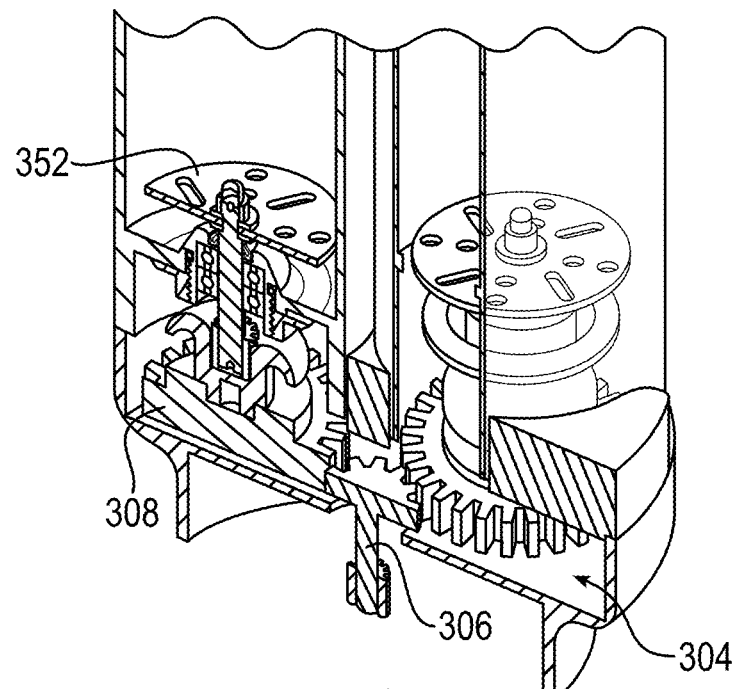
FIG. 8 illustrates a cross-sectional view of the container assembly and the gear box of FIG. 3.
Figure 9:
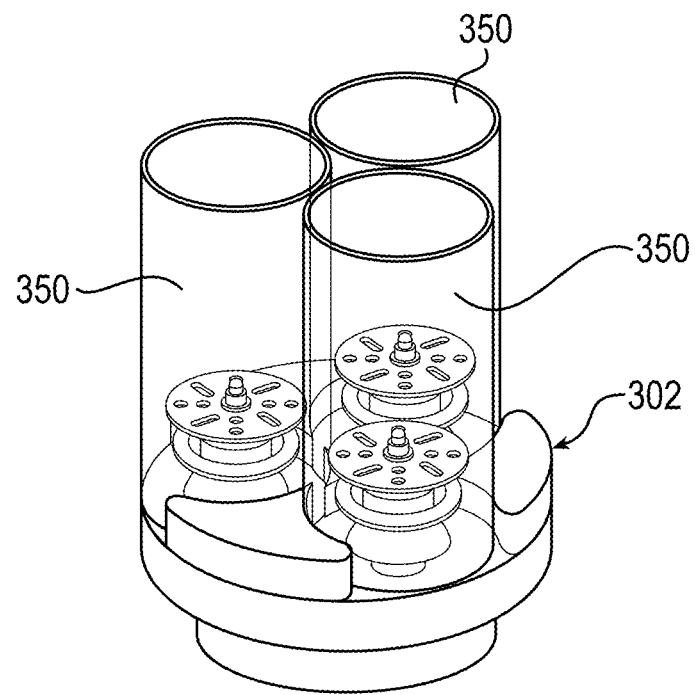
FIG. 9 illustrates a perspective view of the container assembly and the gear box of FIG. 3.
Figure 10:
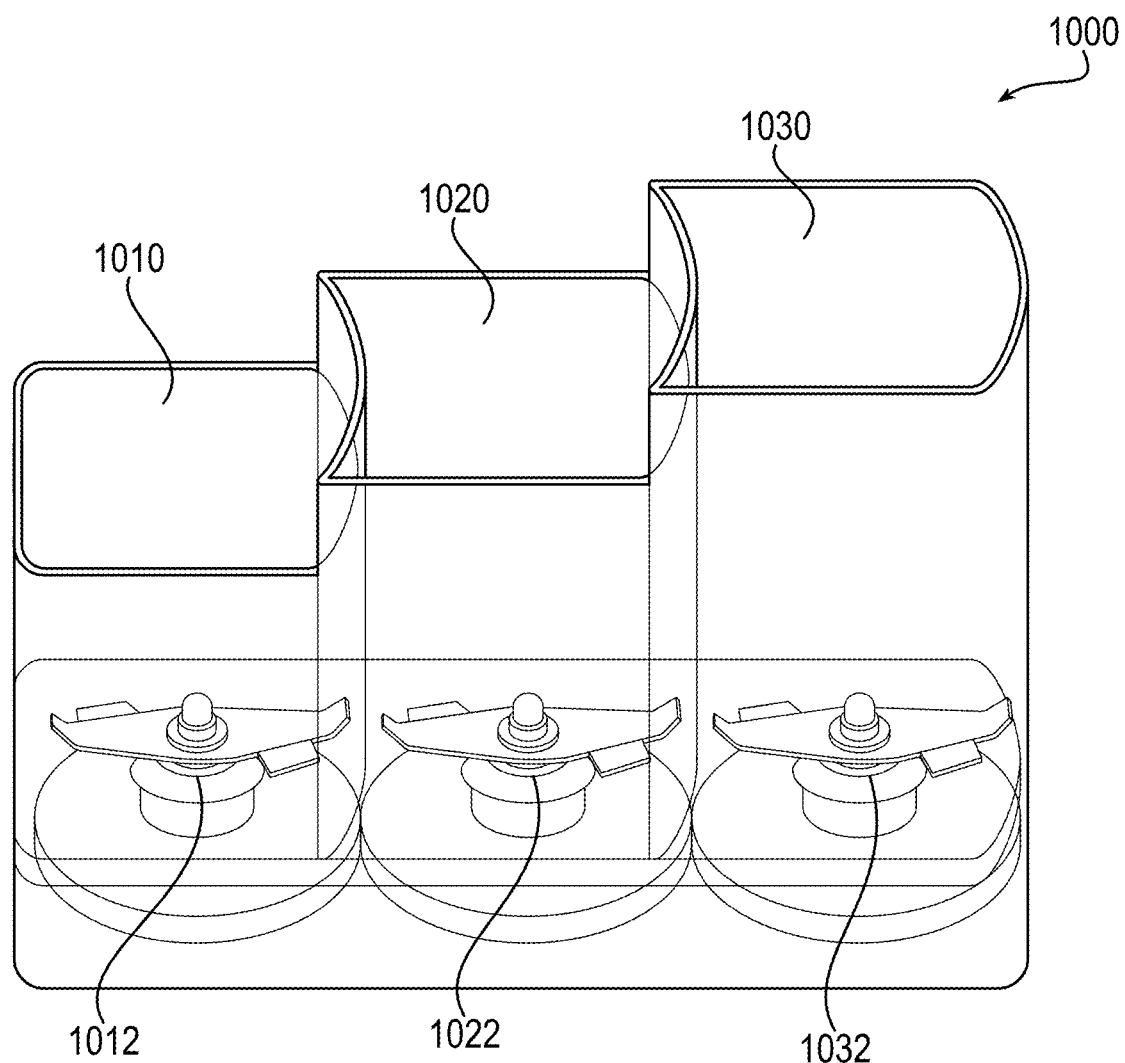
FIG. 10 illustrates a perspective view of a container assembly with a plurality of compartments that may be utilized with a blender base.
Figure 11:
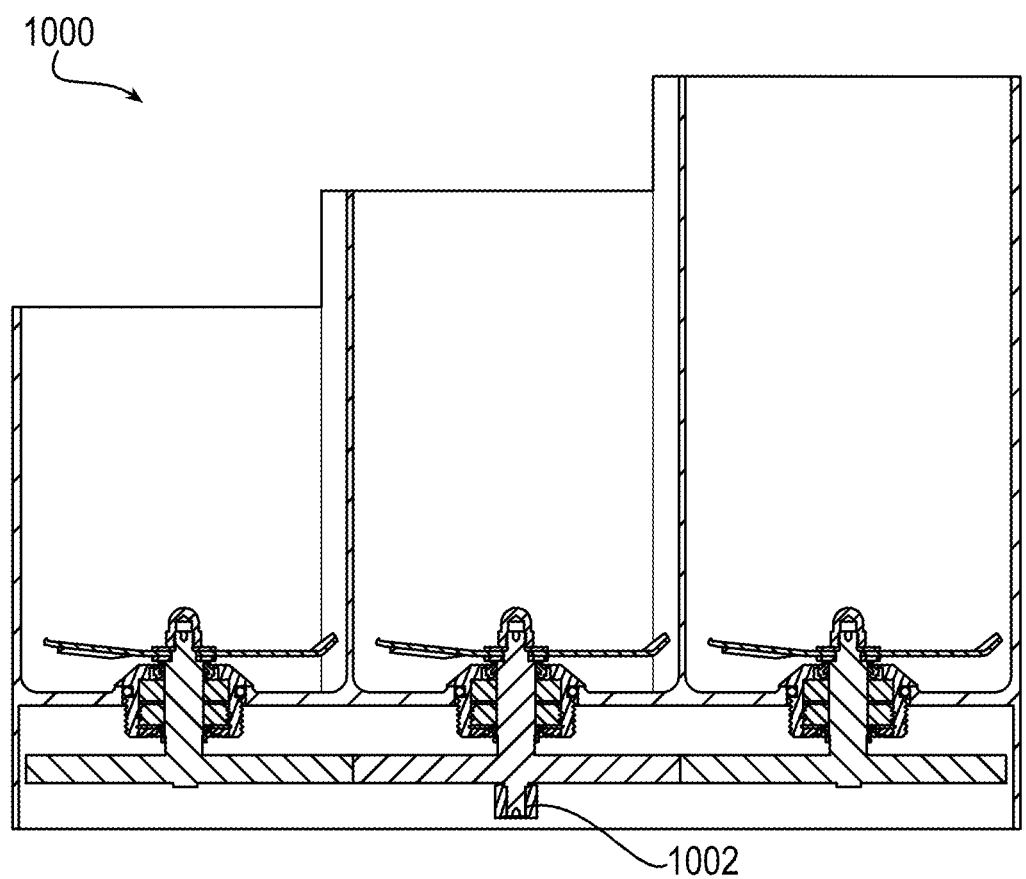
FIG. 11 illustrates a side, cross-sectional view of the container assembly of FIG. 10.
Figure 12:
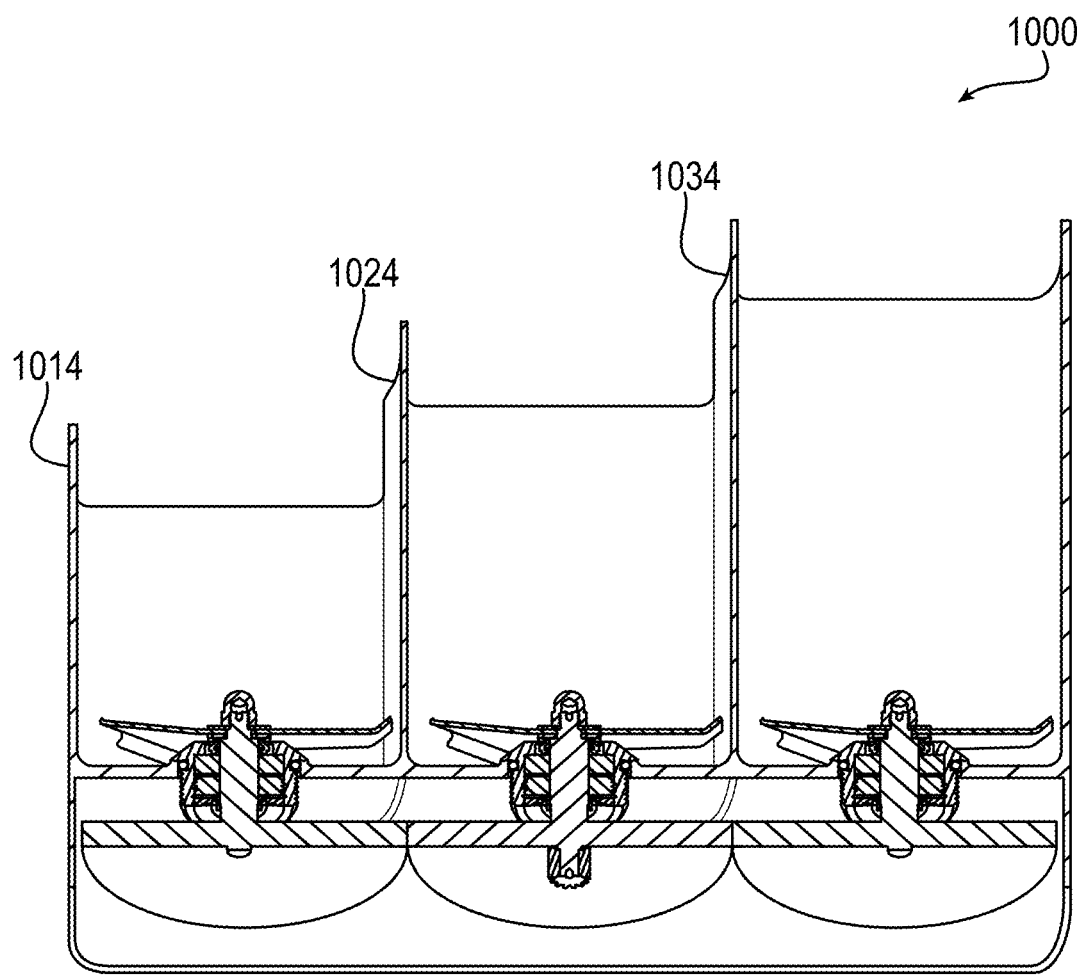
FIG. 12 illustrates a bottom-perspective, cross-sectional view of the container assembly of FIG. 10.
Figure 13:
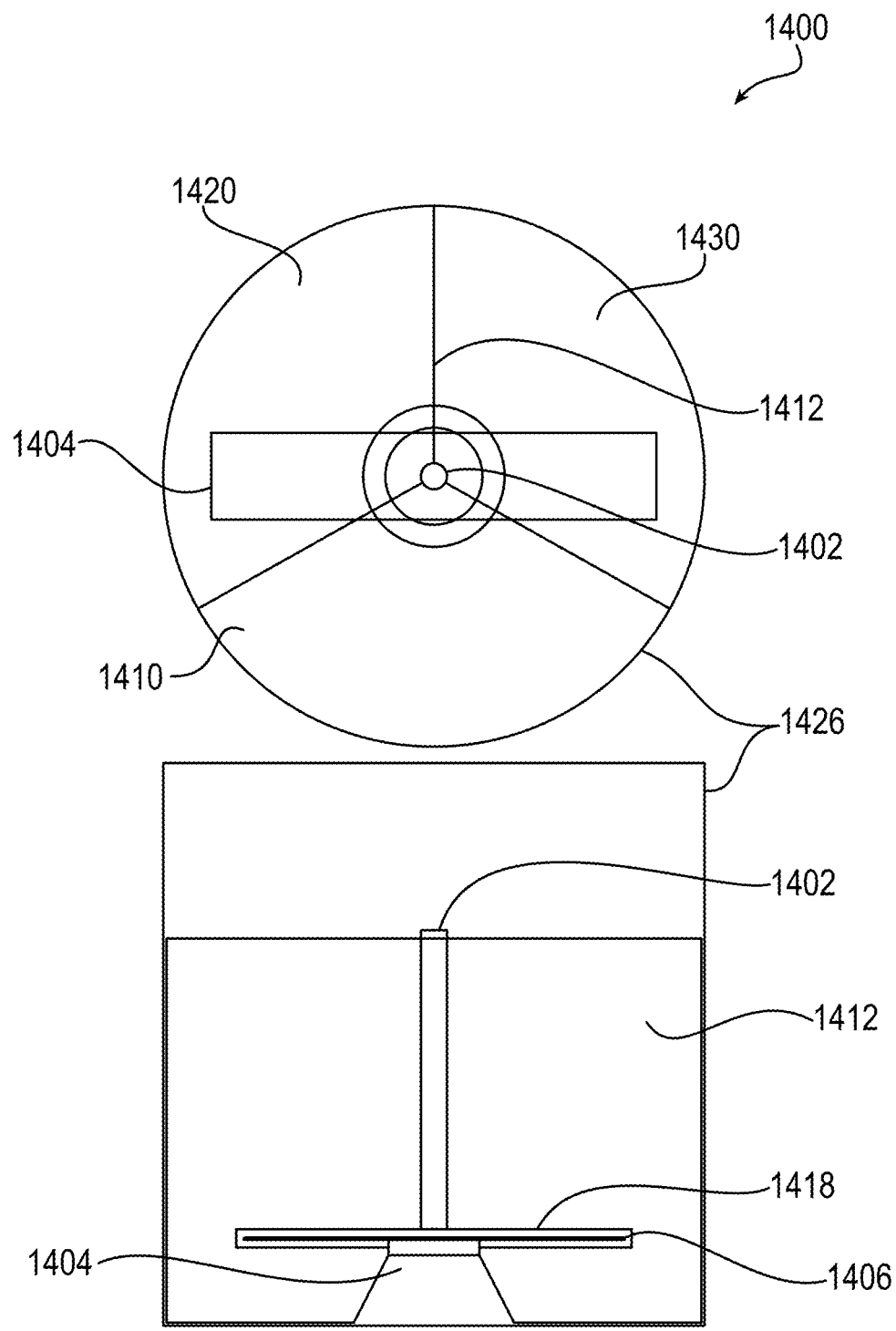
FIG. 13 illustrates another bottom-perspective, cross-sectional view of the container assembly of FIG. 10.

As best shown in FIG. 8, the gear drive 304 may include an input 306 that drives one or more compartment gears 308. The compartment gears in turn drive blade assemblies 352 disposed within or coupled to the compartments 350. It is noted that the blade assemblies 352 may be similar or different to each other. For instance, different compartments 350 may include different blade assemblies 352 designed for different blending products. In an example, at least one of the blade assemblies 352 includes a frothing disk, a wire whisk, or the like. Another blade assembly may comprise blades for blending. It is noted that blade assemblies may be chosen based on a particular type of foodstuff to be blended.

The gear drive 304 may reduce the output speed or speed of blades, while allowing the motor to maintain a higher speed. This may allow for increased airflow within the blender container, increased efficiency of blending, driving of multiple containers, or the like. In another aspect, the gear box 302 may be removed so that a single blending container may be used with the blender base 102.

It is noted that the blending system 300 may include one or more lids (not shown) that may be attached to the compartments 350. The lid(s) may seal the compartments 350. In some embodiments, the lid(s) may be selectively movable or engageable so that different compartments 350 may be selectively opened or closed to assist in pouring and layering of foodstuff. For instance, the lid(s) may be rotatable or hinged so that a first compartment may be unsealed or opened. The contents may then be poured from the first compartment. The lid(s) may be moved again to expose or open a second compartment and the contents may be poured to form a second layer. This may continue until all layers are poured.

In at least one embodiment, a lid can be attached and sealed to the top of the different blending compartments 350 and may contain a movable rotary spout that can provide differing pour times to form the layering, or the geometry of the pouring spout could allow the first mixture to pour first then the second, etc. A user could tip the container assembly upside down to pour and axially rotate the lid so that a singular pour spout could first allow one chamber to empty and then when the opening or pour spout is moved to the next chamber it will be allow that chamber to empty so on, and so forth. This can occur until all chambers are emptied. Moreover, a user may pour only a portion of a chamber or alternate between chambers to create additional layers.

In other examples, the compartments 350 may comprise pour spouts or may be different heights enabling an order of pouring with one pouring motion from the user/worker.

FIGS. 10-13 depict a container assembly 1000 that may be selectively attached to the blender base 102. It is noted that the container assembly 1000 may include or be operatively attached with a gear box, such as gear box 302. The container assembly 1000 may primarily comprise compartments 1010, 1020, and 1030. The compartments 1010, 1020, and 1030 may comprise a unitary constructions or may be operatively attached to each other, to a blender base, or to another component, such as a gear box. It is noted that one or more lids (not shown) may be operatively attached to the container assembly 1000.

The compartments 1010, 1020, and 1030 may each include a blade assembly 1012, 1022, and 1032, respectively. It is noted that the blade assemblies 1012, 1022, and 1032 may comprise similar or different blade assemblies. As described herein, a single input 1002 that may operatively drive one or more of the blade assemblies 1012, 1022, and 1032.

In an exemplary embodiment, the compartments 1010, 1020, and 1030 comprise pour walls 1014, 1024, and 1034. One or more of the pour walls 1014, 1024, and 1034 may be curved, u-shaped, v-shaped, angled (forward, backward, etc.), ribbed, or otherwise shaped. Pouring or rotating the container assembly 1000 in an appropriate direction will ensure that the appropriate compartments 1010, 1020, and 1030 pour in a desired order. The resulting blending product will be layered.

Figures 14, 15:
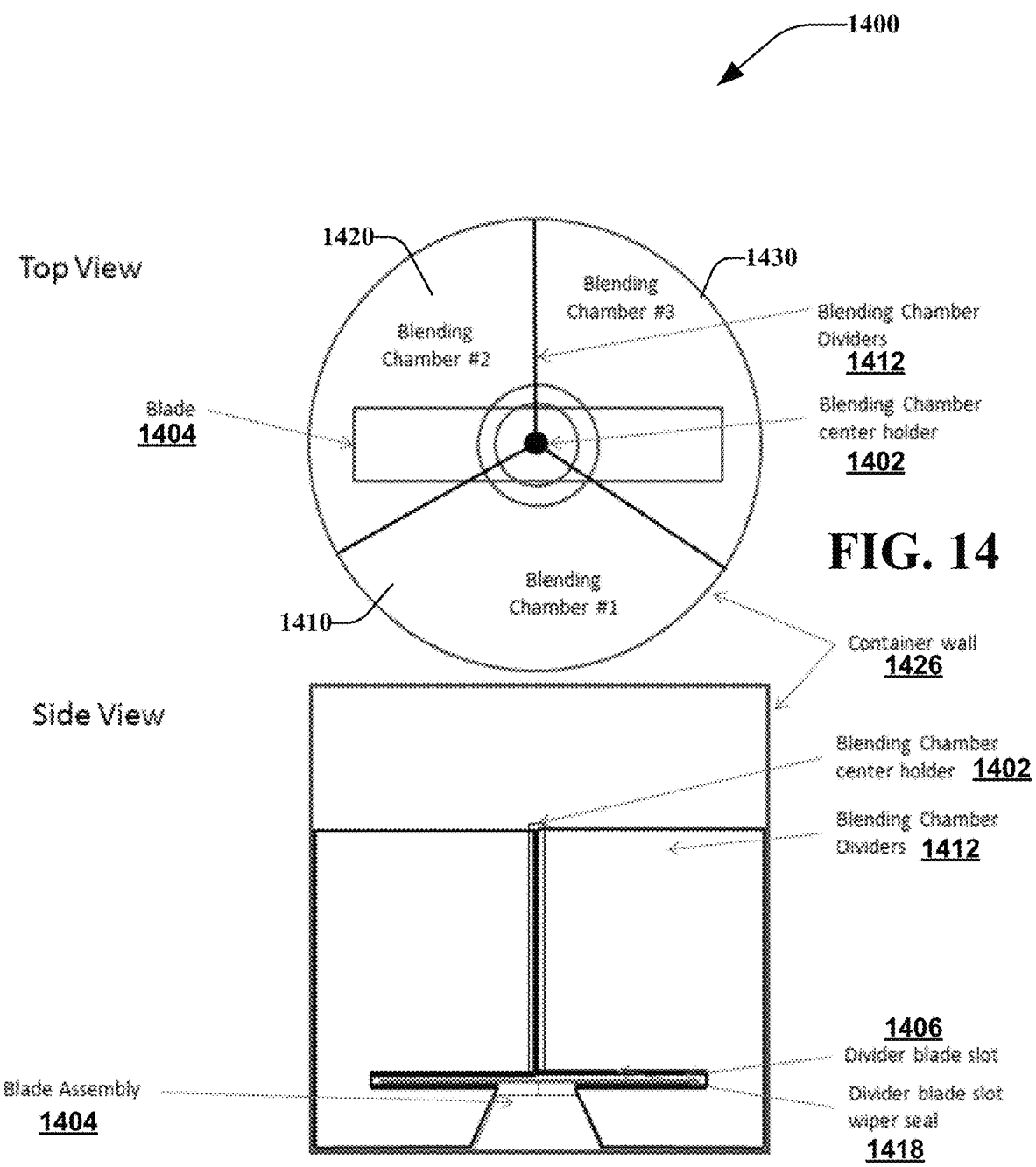
FIG. 14 illustrates a top view of a container assembly with a plurality of compartments and a single blade assembly that may be utilized with a blender base.
FIG. 15 illustrates a side, cross-sectional view of the container assembly of FIG. 14.

Turning now to FIG. 14, there is a container assembly 1400 comprising a container wall 1426 and a plurality of chambers or compartments 1410, 1420, and 1430, defined by the container wall 1426 and dividers 1412. The dividers 1412 may be attached to a general center holder 1402 to support the dividers 1412. In embodiments, a blade assembly 1404 may be positioned to blend foodstuff disposed in each compartment 1410, 1420, and 1430. The dividers 1412 may comprise a slotted opening 1406 to allow the blades to pass through when rotating. In an example, a wiper seal 1418 may be disposed in the opening to generally prevent or reduce mixing of foodstuff between the compartments 1410, 1420, and 1430. The wiper seal 1418 may comprise an elastomeric material that does not degrade or fray from the blade passing through the opening 1406. In another aspect, the wiper seal 1418 may generally wipe the blade as it passes therethrough. In some embodiments the blade assembly 1404 may be generally flat or may comprise a shearing blade such as described in U.S. patent application Ser. No. 14/803, 741. It is noted that embodiments may include multiple openings or slots 1406 on any given divider 1412 to appropriately provide a passage for a blade assembly.

It is further noted that the container assembly 1400 may include pour spouts and/or the dividers 1412 may be configured such that a single pouring motion will result in the compartments 1410, 1420, and 1430 being poured at different times such that a final blended product may be layered in a serving container. The container assembly 1400 may comprise multiple spouts that are configured differently to allow different consistency of fluid to exit.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A blender system comprising:
a blender base;
a motor housed in the blender base;
a drive shaft coupled with the motor;
a container assembly operatively attached to the blender base, wherein the container assembly comprises at least two compartments and wherein the at least two compartments are adjacent and non-coaxial to one another; and
at least one blade assembly operatively attached to the container.

2. The blender system of claim 1 wherein a first blade assembly of the at least one blade assembly is operatively attached to a first compartment of the at least two compartments.

3. The blender system of claim 2, wherein a second blade assembly of the at least one blade assembly is operatively attached to a second compartment of the at least two compartments.

4. The blender system of claim 3, wherein the motor operatively drives the first blade assembly and the second blade assembly when the first compartment and the second compartment are attached to the blender base.

5. The blender system of claim 4, wherein a drive shaft of the motor is operatively coupled to a gear box to drive the first blade assembly and the second blade assembly.

6. The blender system of claim 4, wherein the first and second blade assemblies are each driven by at least one compartment gear.

7. The blender system of claim 1, wherein the container assembly comprises at least one near field communications component identifying parameters associated with the at least two compartments.

8. The blender system of claim 7, wherein the blender base includes a near field communications component operatively communicating with the at least one near field communications component of the container assembly.

9. A blender system comprising:
a blender base comprising a motor;
a gear box operatively comprising at least two output shafts and attached to the blender base and operatively driven by the motor, wherein the at least two output shafts are non-coaxial with each other;
a container assembly comprising at least two compartments that operatively receive foodstuff, wherein the at least two compartments are adjacent one another; and
at least two blade assemblies each comprising an input shaft and operatively attached to the at least two compartments, and wherein the gear box operatively drives the input shafts of the at least two blade assemblies via the at least two output shafts, wherein each input shaft of the at least two blade assemblies are non-coaxial with each other.

10. The blender system of claim 9, further comprising at least one lid operatively attached to the container.

11. The blender system of claim 9, wherein the at least two blade assemblies are each driven by at least one compartment gear.

12. The blender system of claim 9, wherein a first lid of the at least one lid is operatively attached to a first compartment of the at least two compartments comprises a first side wall, and wherein a second lid of the at least one lid is operatively attached to a second compartment of the at least two compartments.

13. The blender system of claim 9 wherein each compartment comprises a pour spout.

14. The blender system of claim 9, wherein a first compartment of the at least two compartments comprises a first side wall, wherein a second compartment of the at least two compartments comprises a second side wall, and wherein the first side wall comprises a different height than the second side wall.

15. The blender system of claim 9 wherein the gearbox comprises a housing operatively separable from the container, wherein the first and second compartments are positioned on the housing.

16. A container assembly comprising:
a bottom wall, a side wall, and at least one dividing wall;
a plurality of compartments defined by the side wall, bottom wall, and at least one dividing walls housed within the container; and
a blade assembly operatively attached to the bottom wall and comprising at least one blade, wherein the at least one blade operatively passes through the plurality of compartments when the blade assembly is rotated.

17. The container assembly of claim 16 wherein each dividing wall of the at least one dividing wall comprises a slotted opening for the passage of the at least one blade.

18. The container assembly of claim 17 wherein each slotted opening comprises an elastomeric seal.

19. The container assembly of claim 16 comprising at least one pour spout defined by the side wall.

20. The container assembly of claim 19, wherein the at least one dividing wall comprises a first wall having a first height and a second wall having a second height and operatively configured such that pouring of foodstuff from the at least one pour spout results in a layered food product.

* * * * *